UNITED STATES PATENT OFFICE.

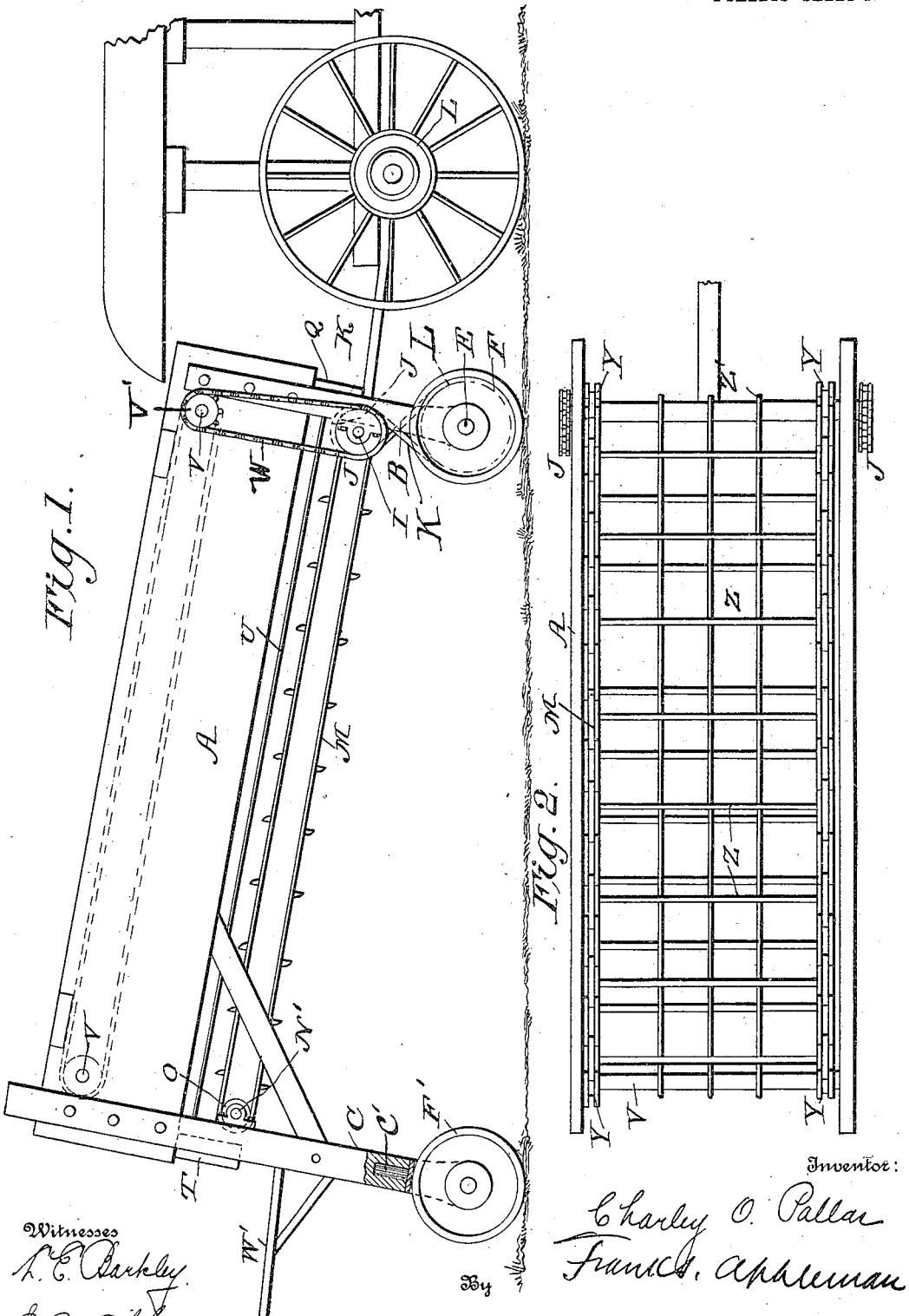

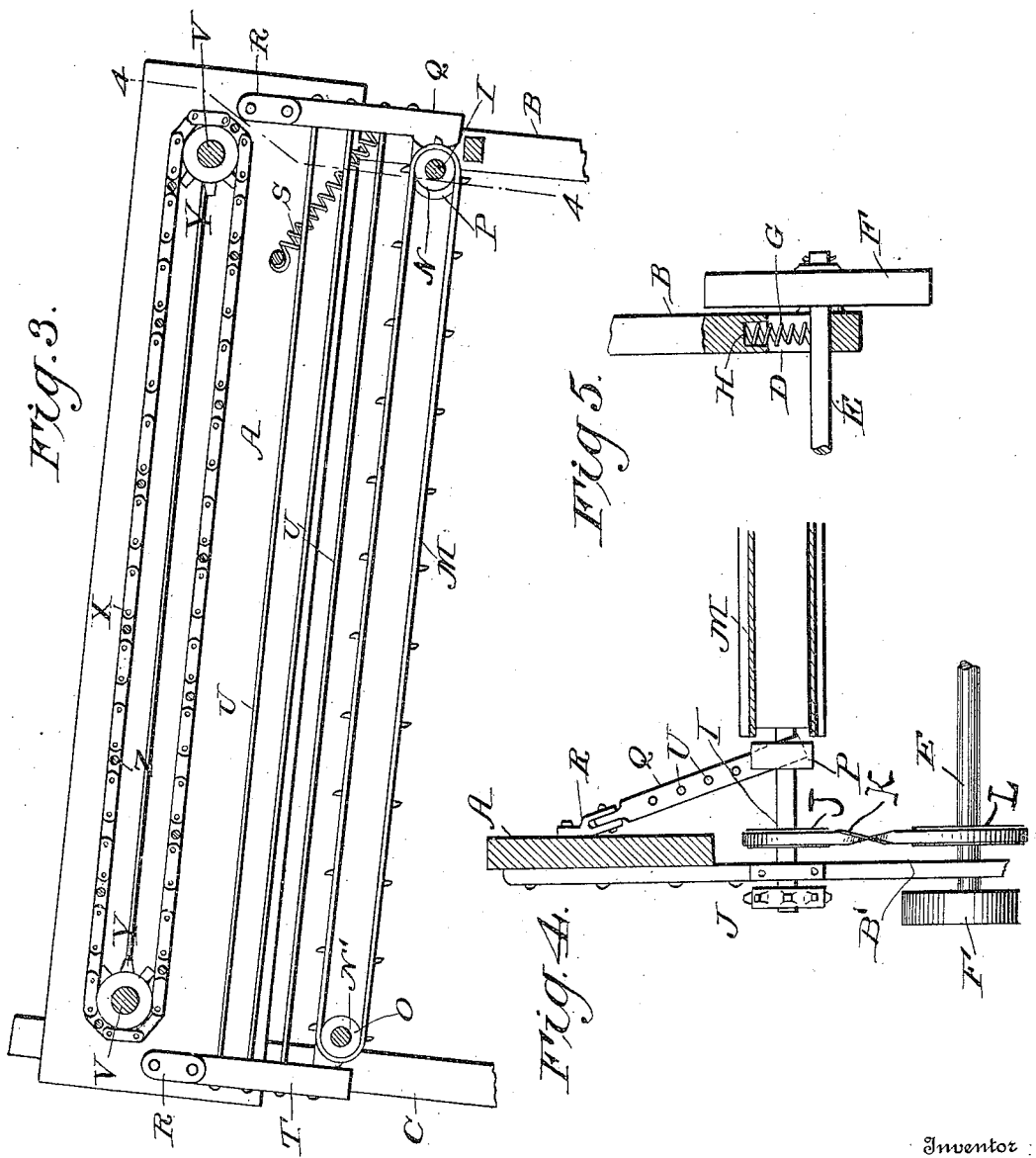

CHARLEY O. PALLAS, OF BARNESVILLE, MINNESOTA.

POTATO-SEPARATOR.

952,755.

Specification of Letters Patent.   Patented Mar. 22, 1910.

Application filed March 11, 1909.   Serial No. 482,773.

*To all whom it may concern:*

Be it known that I, CHARLEY O. PALLAS, a citizen of the United States of America, residing at Barnesville, in the county of Clay and State of Minnesota, have invented certain new and useful Improvements in Potato-Separators, of which the following is a specification.

This invention relates to potato diggers and separators and particularly to a separator designed to follow a digger and to receive the excavated material in order that the material may be separated from the potatoes that are conveyed by the digger.

An object of this invention is to provide novel means for separating potatoes from the grass and vines and from earth which has been dug with the potatoes, novel means being provided for carrying the grass and vines rearwardly and for discharging them clear of the separated potatoes; furthermore, an object of this invention is to sift the earth from the potatoes and for directing the potatoes to a conveyer which carries them rearwardly and deposits them into a suitable receptacle which may be located on the platform at the rear of the separator.

A further object of this invention is to provide novel means for vibrating the moving or sifting device, thus insuring a proper operation of the said sifting device which further acts to direct or guide the potatoes to the conveyer heretofore referred to.

A still further object of this invention is to provide a conveyer with wheels having yieldable connection with the frame of the separator in order that the said wheels may travel over the uneven surface of a field without seriously vibrating or jarring the operating parts of the mechanism.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a view in elevation of the rear portion of an excavator with the separating device applied thereto, the said separating device being shown in side elevation; Fig. 2, is a top plan view of the separating device, the sifter being omitted; Fig. 3, is a longitudinal vertical sectional view of the separating device, the connections for operating the conveyer being omitted; Fig. 4, is a sectional view on the line 4—4 of Fig. 3; and Fig. 5, is a detail sectional view of the means for yieldingly supporting the frame of the separator on the traction wheels thereof.

In these drawings A, denotes a frame having standards B and C, at the front and rear thereof, respectively, each of said standards B having its lower end provided with a slot D, the walls of which form guides for the shaft E, of the ground wheel F. The shaft E, bears against a spring G, seated in a recess H, of a standard, and hence movement of the shaft with relation to the standard is afforded which permits the travel of the wheel over uneven surfaces of ground without seriously disturbing the frame of the separator.

The rear standards C, are provided with apertures in the lower ends to receive the shanks C', of caster wheels F', each wheel F', of the standards being independently movable in order that they may turn with relation to the standards when the front member of the frame is turning with the excavator. This construction and arrangement of parts permits the rear wheel to travel under the influence of the power applied to advance or turn the excavator. The front standards B, have bearings for the transversely disposed shaft I, which has wheels J, thereon, which wheels are engaged by the flexible connections K, run from the wheel L, on the shaft E, of the ground wheel.

The shaft I, is designed primarily for driving the conveyer M, which is mounted on a pulley N of said shaft so that as the shaft I is rotated, the conveyer is moved toward the rear of the machine in order to carry the potatoes which have been separated. At the rear of the separator, I provide a shaft N', having an idler O, thereon over which the conveyer is run. The shaft I, is further provided with the cams or eccentrics P, designed to engage the arms Q, which arms are pivotally connected to brackets R, secured to the sides of the frame of the separator. As shown in Fig. 4, each arm depends on an incline into engagement with the cam or eccentric heretofore described and each arm is held in engagement with the portions of the eccentric through the medium of a spring S, which draws it into contact with said cam or eccentric. At the rear of the frame are two arms T, one on each side of the frame designed to correspond and coact with an arm Q, the said arms T and Q, on each side of the frame being connected by a series of wires or bars U, which are so positioned with relation to one another that they form a screen designed to permit the passage therethrough of earth which has been separated from the potatoes, the said bars or wires being sufficiently close together to prevent the passage therebetween of potatoes of useful size, and the said bars or wires act to deflect or direct the potatoes to the conveyer heretofore described. From an inspection of the drawing, it will be observed that the arms extend inwardly and downwardly from the sides of the frame and terminate at the sides of the conveyer, the relation of the arm on one side of the conveyer to the said conveyer being well shown in Fig. 4.

As a means for preventing grass and other vegetation from reaching the conveyer or the sifter I provide near the top of the frame and near each end thereof, the shafts V, and the front shaft is provided with a sprocket wheel V', rotated by a sprocket chain W, driven from the shaft I. The shafts V, are provided with sprocket wheels Y, engaged by sprocket chains X, which sprocket chains carry a skeleton conveyer formed by the cross bars Z, separated a suitable distance to permit earth and potatoes to pass therethrough, whereas they will arrest and carry vines and other vegetation, and as a further precaution against the passage of vines and other vegetation to the conveyer and sifter, I provide a series of longitudinally disposed wires Z', forming guards, extending from the front to the rear of the frame under the skeleton conveyer, so that vines and other vegetation which have passed through the meshes of the skeleton conveyer will be caught on the longitudinally disposed wires and will be caught by the skeleton conveyer and carried rearwardly of the frame.

From the foregoing, it will be seen that precaution is taken against the access of vines and other vegetation to the conveyer or sifter which might in any way interfere with the operation thereof or impair their utility.

The rear of the frame is provided with a platform W', which is designed to support receptacles for the potatoes and it may be sufficiently strong to support an operator who may place the receptacles in position to receive the potatoes from the conveyer.

I claim—

1. In a potato separator, a frame, sets of shafts mounted in the frame at the front and rear thereof, a conveyer run over one set of shafts, a skeleton conveyer above the first mentioned conveyer run on another set of shafts, means for rotating the sets of shafts in unison, sifters pivotally mounted to move longitudinally in the frame and extending inwardly and downwardly into operative relation to the first mentioned conveyer, and means for reciprocating the sifters.

2. In a potato separator, a frame, sets of shafts mounted in the frame at the front and rear thereof, a conveyer run over one set of shafts, a skeleton conveyer above the first mentioned conveyer run on another set of shafts, means for rotating the sets of shafts in unison, sifters pivotally mounted in the frame and extending inwardly and downwardly into operative relation to the first mentioned conveyer, and means on the conveyer shaft for reciprocating the sifters.

3. In a potato separator, a frame, sets of shafts mounted in the frame at the front and rear thereof one above the other, a conveyer run over the lower set of shafts, a skeleton conveyer run on the upper set of shafts, means for rotating the sets of shafts in unison, sifters having arms mounted to oscillate longitudinally in the frame, and means for oscillating the arms.

4. In a potato separator, a frame, sets of shafts mounted in the frame at the front and rear thereof one above the other, a conveyer run over the lower set of shafts, a skeleton conveyer run on the upper set of shafts, means for rotating the sets of shafts in unison, sifters having arms mounted to oscillate longitudinally in the frame, and means on the shaft for oscillating the arms.

5. In a potato separator, a frame, sets of shafts mounted in the frame at the front and rear thereof, a conveyer run over one set of shafts, a skeleton conveyer above the first mentioned conveyer run on another set of shafts, means for rotating the sets of shafts in unison, sifter arms suspended to swing longitudinally of the sides of the frame and extending inwardly and downwardly therefrom, a sifter carried by the arms adapted to deposit on the first mentioned conveyer, and means for oscillating the arms.

6. In a potato separator, a frame, sets of shafts mounted in the frame at the front and rear thereof, a conveyer run over one set of shafts, a skeleton conveyer above the first mentioned conveyer run on another set of shafts, means for rotating the sets of shafts in unison, sifter arms oscillatingly supported from the sides of the frame and extending inwardly and downwardly therefrom, a sifter carried by the arms adapted to deposit on the first mentioned conveyer, and means on the conveyer shaft for oscillating said arms.

7. In a potato separator, a frame, sets of shafts mounted in the frame at the front and rear thereof, a conveyer above the first mentioned conveyer run over one set of shafts, a skeleton conveyer run on another set of shafts, means for rotating the sets of shafts in unison, sifter arms oscillatingly supported from the sides of the frame and extending inwardly and downwardly therefrom, a sifter carried by the arms adapted to deposit on the first mentioned conveyer, and cams on the conveyer shaft for oscillating said arms.

8. In a potato separator, a frame, a conveyer mounted in the frame, sifters converging toward the conveyer, each of said sifters comprising two pivotally mounted arms connected by wires or bars, means for moving the conveyer, and means on the conveyer moving means for oscillating the sifters.

9. In a potato separator, a frame, a conveyer therein, sifters suspended from the sides of the frame and converging into operative relation with the conveyer, wire guards above the sifters for preventing access of the vegetation to the sifters, and a skeleton conveyer movable above the said guard.

In testimony whereof, I affix my signature in the presence of two witnesses.

CHARLEY O. PALLAS.

Witnesses:
R. C. HENDERSON,
ORRIS OLIVER.